(12) United States Patent
Tang et al.

(10) Patent No.: US 10,956,748 B2
(45) Date of Patent: Mar. 23, 2021

(54) VIDEO CLASSIFICATION METHOD, INFORMATION PROCESSING METHOD, AND SERVER

(71) Applicant: TENCENT TECHNOLOGY (SHENZHEN) COMPANY LIMITED, Shenzhen (CN)

(72) Inventors: Yongyi Tang, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 65 days.

(21) Appl. No.: 16/558,015

(22) Filed: Aug. 30, 2019

(65) Prior Publication Data

US 2019/0384985 A1  Dec. 19, 2019

Related U.S. Application Data

(63) Continuation of application No. PCT/CN2018/100733, filed on Aug. 16, 2018.

(30) Foreign Application Priority Data

Sep. 15, 2017 (CN) .......................... 201710833668.8

(51) Int. Cl.
*G06K 9/00* (2006.01)
*G06F 17/15* (2006.01)
(Continued)

(52) U.S. Cl.
CPC ......... *G06K 9/00718* (2013.01); *G06F 17/15* (2013.01); *G06K 9/6267* (2013.01); *G06N 3/0454* (2013.01)

(58) Field of Classification Search
CPC .. G06K 9/00718; G06K 9/6267; G06F 17/15; G06N 3/0454
See application file for complete search history.

(56) References Cited

U.S. PATENT DOCUMENTS 8,990,132 B2    3/2015  Lo
10,334,202 B1 *  6/2019  Zhou .................... G06N 3/0445
(Continued)

FOREIGN PATENT DOCUMENTS

CN    103544498 A    1/2014
CN    104331442 A    2/2015
(Continued)

OTHER PUBLICATIONS

The World Intellectual Property Organization (WIPO) International Search Report for PCT/CN2018/100733 dated Nov. 14, 2018 5 Pages (including translation).
(Continued)

*Primary Examiner* — Utpal D Shah
(74) *Attorney, Agent, or Firm* — Anova Law Group, PLLC

(57) ABSTRACT

A video classification method is provided for a computer device. The method includes obtaining a to-be-processed video, where the to-be-processed video has a plurality of video frames, and each video frame corresponds to one time feature; and sampling the to-be-processed video according to a time-feature sampling rule, and obtaining at least one video frame feature sequence. The time-feature sampling rule is a correspondence between time features and video frame feature sequences. The method also includes processing the video frame feature sequence by using a first neural network model, to obtain a feature representation result corresponding to the video frame feature sequence, where the first neural network model is a recurrent neural network model; and processing the feature representation result by
(Continued)

using a second neural network model, to obtain a prediction result corresponding to the video frame feature sequence.

20 Claims, 12 Drawing Sheets

(51) Int. Cl.
*G06K 9/62* (2006.01)
*G06N 3/04* (2006.01)

(56) References Cited

U.S. PATENT DOCUMENTS

| | | | |
|---|---|---|---|
| 10,418,957 B1* | 9/2019 | Wang | G10L 25/51 |
| 10,699,129 B1* | 6/2020 | Jiang | G06K 9/00718 |
| 2016/0283841 A1* | 9/2016 | Sainath | G10L 15/16 |
| 2017/0061966 A1* | 3/2017 | Marcheret | G06K 9/00718 |
| 2017/0228618 A1* | 8/2017 | Jiang | G06N 3/084 |
| 2017/0308756 A1* | 10/2017 | Sigal | G06K 9/00718 |
| 2018/0032846 A1* | 2/2018 | Yang | G06K 9/4604 |
| 2019/0171936 A1* | 6/2019 | Karras | G06N 3/0454 |
| 2019/0286990 A1* | 9/2019 | Kenney | G06N 3/0454 |
| 2019/0384981 A1* | 12/2019 | Swaminathan | G06K 9/6256 |

FOREIGN PATENT DOCUMENTS

| | | |
|---|---|---|
| CN | 104966104 A | 10/2015 |
| CN | 106131627 A | 11/2016 |
| CN | 106503723 A | 3/2017 |
| CN | 106779467 A | 5/2017 |

OTHER PUBLICATIONS

Sergey Ioffe et al., "Batch Normalization: Accelerating Deep Network Training by ReducingInternal Covariate Shift", In Proceedings of the International Conference on Machine Learning (ICML), pp. 448-456, 2015. 9 Pages.

The State Intellectual Property Office of the People's Republic of China (SIPO) Office Action 1 for 201910834142.0 dated Nov. 3, 2020 11 Pages (including translation).

Shaoxiang Chen et al., "Aggregating Frame-level Features for Large-Scale Video classification," arXiv: 1707.00803v1 [cs.CV], Jul. 4, 2017 (Jul. 4, 2017), pp. 1-6. 6 pages.

* cited by examiner

US 10,956,748 B2

VIDEO CLASSIFICATION METHOD, INFORMATION PROCESSING METHOD, AND SERVER

RELATED APPLICATIONS

This application is a continuation application of PCT Patent Application No. PCT/CN2018/100733, filed on Aug. 16, 2018, which claims priority to Chinese Patent Application No. 2017108336688, filed with the China National Intellectual Property Administration on Sep. 15, 2017 and entitled "VIDEO CLASSIFICATION METHOD, INFORMATION PROCESSING METHOD, AND SERVER", which is incorporated herein by reference in its entirety.

FIELD OF THE TECHNOLOGY

The present disclosure relates to the field of computer technologies and, in particular, to a video classification technology.

BACKGROUND OF THE DISCLOSURE

With the rapid development of network multimedia technologies, various multimedia information constantly emerges. A growing number of users are used to watching videos on the network. To enable the users to select, from a large number of videos, content that the users want to watch, a server usually classifies the videos, and video classification has great significance for implementing video management and interest recommendation.

A currently used video classification method mainly includes: first performing feature extraction on each video frame in a to-be-marked video, and then converting, by using an average feature method, a frame-level feature into a video-level feature, and finally, transmitting the video-level feature into a classification network for classification.

However, in the current video classification method, converting the frame-level feature only by using the average feature method is relatively simple and, during the video classification process, the impact of changes in other dimensions on video frame feature conversion is often ignored, and the accuracy of video classification is undesired.

SUMMARY

The embodiments of the present invention provide a video classification method, an information processing method, and a server. In the process of classifying a video, the feature change of the video in the time dimension is also considered, so that video content can be better represented, the accuracy of video classification is improved, and the effect of video classification is improved.

In one aspect of the present disclosure, a video classification method for a computer device. The method includes obtaining a to-be-processed video, where the to-be-processed video has a plurality of video frames, and each video frame corresponds to one time feature; sampling the to-be-processed video according to a time-feature sampling rule, and obtaining at least one video frame feature sequence, where the time-feature sampling rule is a correspondence between time features and video frame feature sequences. The method also includes processing the at least one video frame feature sequence by using a first neural network model, to obtain a feature representation result corresponding to the at least one video frame feature sequence, where the first neural network model is a recurrent neural network model; and processing the feature representation result corresponding to the at least one video frame feature sequence by using a second neural network model, to obtain a prediction result corresponding to the at least one video frame feature sequence.

In another aspect of the present disclosure, a non-transitory computer-readable storage medium is provided. The non-transitory computer-readable storage medium stores computer program instructions executable by at least one processor to perform: obtaining a to-be-processed video, the to-be-processed video having a plurality of video frames, and each video frame corresponding to one time feature; sampling the to-be-processed video according to a time-feature sampling rule, and obtaining at least one video frame feature sequence, the time-feature sampling rule being a correspondence between time features and video frame feature sequences; processing the at least one video frame feature sequence by using a first neural network model, to obtain a feature representation result corresponding to the at least one video frame feature sequence, the first neural network model being a recurrent neural network model; and processing the feature representation result corresponding to the at least one video frame feature sequence by using a second neural network model, to obtain a prediction result corresponding to the at least one video frame feature sequence.

In another aspect of the present disclosure, a server is provided. The server includes a memory storing computer program instructions; and a processor coupled to the memory. When executing the computer program instructions, the processor is configured to perform: obtaining a to-be-processed video, the to-be-processed video having a plurality of video frames, and each video frame corresponding to one time feature; sampling the to-be-processed video according to a time-feature sampling rule, and obtaining at least one video frame feature sequence, the time-feature sampling rule being a correspondence between time features and video frame feature sequences; processing the at least one video frame feature sequence by using a first neural network model, to obtain a feature representation result corresponding to the at least one video frame feature sequence, the first neural network model being a recurrent neural network model; and processing the feature representation result corresponding to the at least one video frame feature sequence by using a second neural network model, to obtain a prediction result corresponding to the at least one video frame feature sequence.

DETAILED DESCRIPTION

The embodiments of the present disclosure provide a video classification method, an information processing method, and a server. In the process of classifying a video, the feature change of the video in a time dimension is also considered, so that video content can be better represented, the accuracy of video classification is improved, and the effect of video classification is improved.

In the specification, claims, and accompanying drawings of the present disclosure, the terms "first", "second", "third", "fourth", and so on (if exists) are intended to distinguish similar objects but do not necessarily indicate a specific order or sequence. It is to be understood that, data used in this way is exchangeable in a proper case, so that the embodiments of the present disclosure that are described herein, for example, can be implemented in another order except those shown or described herein. Moreover, the terms "include", "contain" and any other variants mean to cover the non-exclusive inclusion. For example, a process, method, system, product, or device that includes a series of steps or units is not necessarily limited to those steps or units that are expressly listed, but may include other steps or units not expressly listed or inherent to such a process, method, product, or device.

It is to be understood that the solutions in the present disclosure may be mainly used to provide a video content classification service. A backend computer device performs feature extraction, time sequence modeling, and feature compression on a video, and finally classifies video features by using a mixed expert model, so that automatic classification and labeling on the video are implemented on the computer device. Such solutions may be deployed on a video type website to add key words for videos on the video type website, and quick search and content matching can also be facilitated, and video personalized recommendation can also be facilitated.

Figure 1:
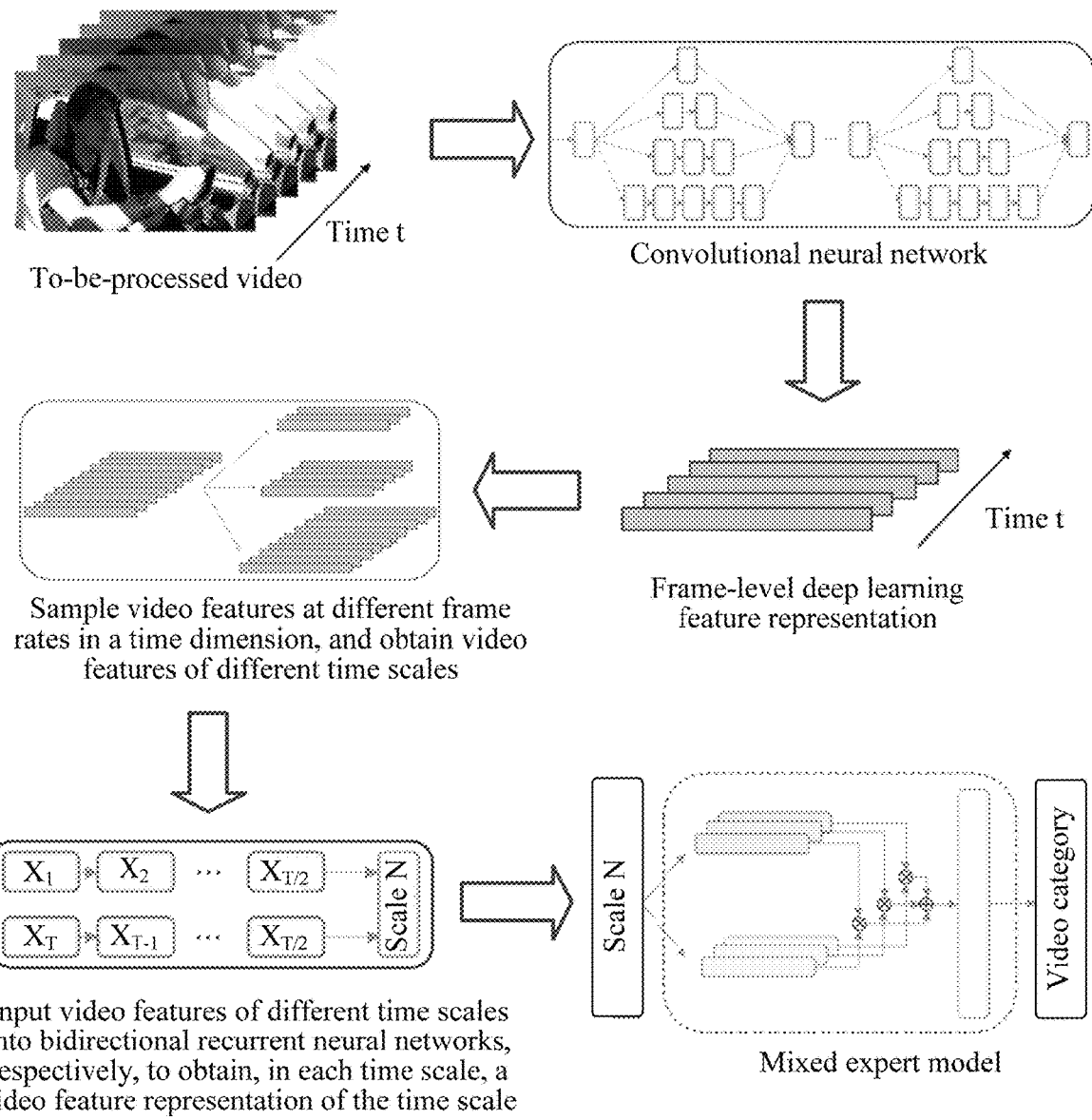
FIG. 1 is a schematic architectural diagram of information processing according to an embodiment of the present disclosure.

FIG. 1 is a schematic architectural diagram of information processing according to an embodiment of the present disclosure. As shown in FIG. 1, first, a computer device obtains a to-be-processed video. It can be learned from FIG. 1 that the to-be-processed video includes a plurality of video frames, and each video frame corresponds to a time feature, and different time features may be represented by t. Next, the computer device processes each video frame in the to-be-processed video by using a convolutional neural network, to obtain a time feature corresponding to each video frame. Then, the computer device determines a time feature sequence of the to-be-processed video according to the time feature corresponding to each video frame. The time feature sequence is deep learning representation at the frame level.

Further, continuing to refer to FIG. 1, the computer device may sample the to-be-processed video according to a time-feature sampling rule. The time-feature sampling rule refers to sampling video features at different frame rates in a time dimension, and obtaining at least one video frame feature sequence. The video frame feature sequences correspond to different time scales. The computer device inputs video frame feature sequences corresponding to different time scales into bidirectional recurrent neural networks, respectively, to obtain a feature representation result corresponding to at least one video frame feature sequence. The feature representation result is video feature representation in a time scale. Finally, the computer device inputs all feature representation results into a second neural network, namely, the mixed expert model, and obtains a prediction result corresponding to each video frame feature sequence, and can determine a category of the to-be-processed video according to the prediction results, to classify the to-be-processed video.

In common video data, a user usually describes and comments video information and provides personalized label data, to form rich text information related to online videos. The text information may also be used as basis for video classification.

Figure 2:
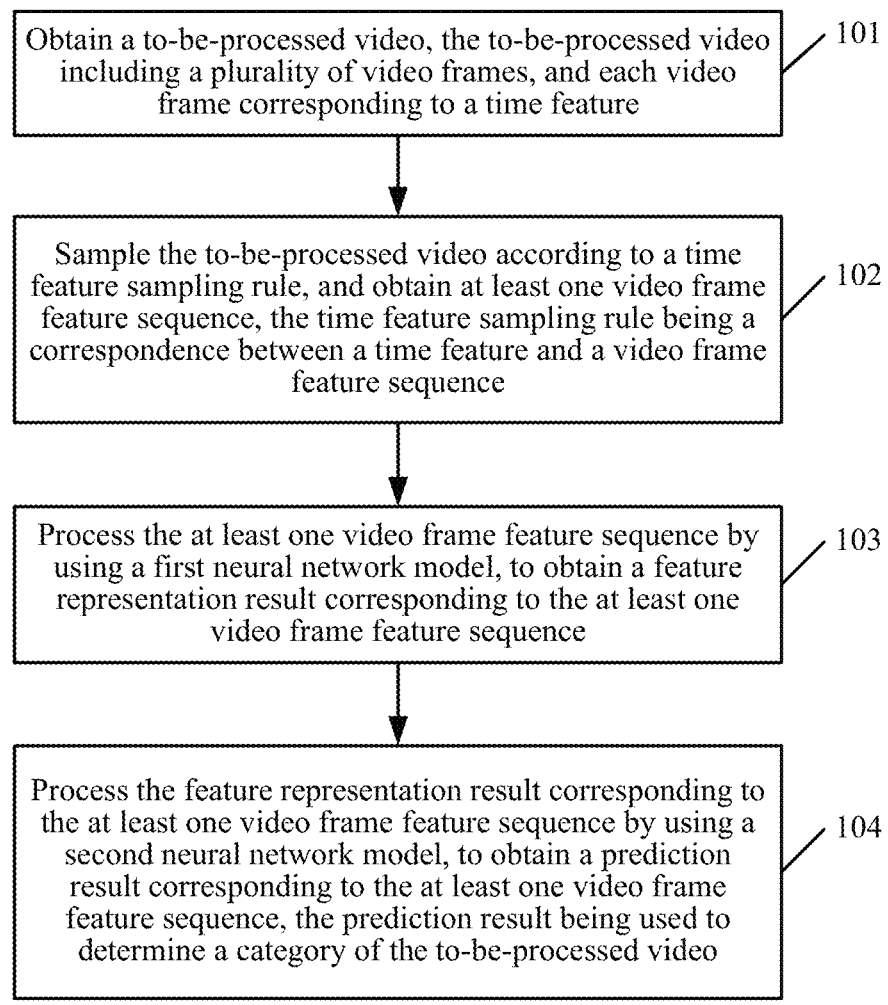
FIG. 2 is a schematic diagram of an information processing method according to an embodiment of the present disclosure.

The following describes the information processing method in the present disclosure by using a server as an execution entity. It is to be understood that the information processing method in the present disclosure not only can be applied to the server, but also can be applied to any other computer device. Referring to FIG. 2, the information processing method in one embodiment of the present disclosure includes:

101: Obtain a to-be-processed video, the to-be-processed video including a plurality of video frames, and each video frame corresponding to a time feature.

Figure 3:
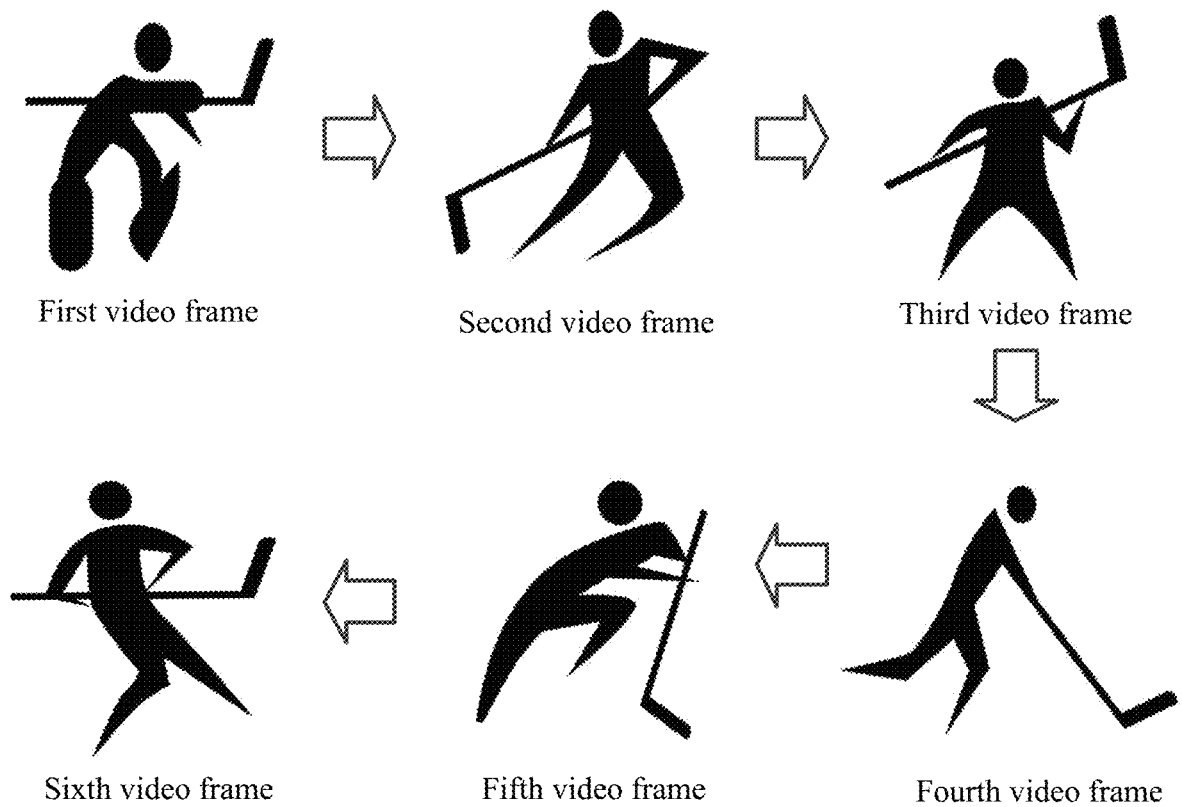
FIG. 3 is a schematic diagram of a to-be-processed video according to an embodiment of the present disclosure.

In one embodiment, the server first obtains the to-be-processed video. Specifically, refer to FIG. 3. FIG. 3 is a schematic diagram of the to-be-processed video in one embodiment of the present disclosure. The to-be-processed video includes a plurality of video frames. For example, each picture in FIG. 3 is a video frame, and each video frame corresponds to a time feature.

The to-be-processed video corresponds to a period of play time. Therefore, each video frame corresponds to a different play moment. Assuming that a time feature of a first video frame in the to-be-processed video is "1", and a time feature of a second video frame is "2", by this analogy, a time feature of a Tth video frame is "T".

102: Sample the to-be-processed video according to a time-feature sampling rule, and obtain at least one video frame feature sequence, the time-feature sampling rule being a correspondence between a time feature and a video frame feature sequence.

In one embodiment, the server samples the to-be-processed video according to the time-feature sampling rule. The time-feature sampling rule includes a preset relationship between a time feature and a video frame feature sequence. In actual application, one video frame feature sequence may be obtained, or video frame feature sequences of at least two different time scales may be obtained. For the video frame feature sequences corresponding to different time scales, the number of time features corresponding to each included video frame feature is different, and correspondingly, lengths of the video frame feature sequences corresponding to different time scales are also different.

For example, one to-be-processed video has a total of 1000 video frames, and the 1000 video frames respectively correspond to 1 to 1000 time features. If the time-feature sampling rule is that each time feature corresponds to one video frame feature, 1000 time features of the to-be-processed video correspond to 1000 video frame features. Correspondingly, the length of the video frame feature sequence formed by the 1000 video frame features is 1000. If the time-feature sampling rule is that every 100 time features correspond to one video frame feature, the 1000 time features of the to-be-processed video correspond to 10 video frame features. Correspondingly, the length of the video frame feature sequence formed by the 10 video frames is 10, and so on, and details are not described herein.

103: Process the at least one video frame feature sequence by using a first neural network model, to obtain a feature representation result corresponding to the at least one video frame feature sequence, each video frame feature sequence corresponding to a feature representation result.

In one embodiment, after obtaining the at least one video frame feature sequence, the server may separately input video frame feature sequences corresponding to different time scales into the first neural network model. The first neural network model is a recurrent neural network model. Then the first neural network model recurses the input at least one video frame feature sequence, and correspondingly outputs a feature representation result of each video frame feature sequence.

Different time scales are different lengths of the video frame feature sequences. As described in Step 102, assuming that the total length of the video is T, if each time feature corresponds to a video frame feature, the length of the video frame feature sequence is T/1. If every 10 time-features correspond to a video frame feature, the length of the video frame feature sequence is T/10.

104: Process the feature representation result corresponding to the at least one video frame feature sequence by using a second neural network model, to obtain a prediction result corresponding to the at least one video frame feature sequence, the prediction result being used to determine a category of the to-be-processed video. Each video frame feature sequence corresponds to a prediction result. In one embodiment, the server may separately input the feature representation result corresponding to each video frame feature sequence into the second neural network model, and then after processing each input feature representation result by using the second neural network model, the server outputs the prediction result corresponding to each feature representation result. Finally, the server may determine the category of the to-be-processed video according to the prediction result.

It may be understood that the category of the to-be-processed video may be "sports", "news", "music", "animation", "game", or the like, and is not limited herein.

In one embodiment of the present disclosure, an information processing method is provided. First, the server obtains the to-be-processed video, the to-be-processed video including a plurality of video frames, and each video frame corresponding to a time feature, and then samples the to-be-processed video according to the time-feature sampling rule, and obtains the at least one video frame feature sequence, the time-feature sampling rule being the correspondence between the time feature and the video frame feature sequence. The server then inputs the at least one video frame feature sequence into the first neural network model, to obtain the feature representation result corresponding to the at least one video frame feature sequence, the first neural network model being a recurrent neural network model. Finally, the server inputs the feature representation result corresponding to the at least one video frame feature sequence into the second neural network model, to obtain the prediction result corresponding to each video frame feature sequence, the prediction result being used to determine the category of the to-be-processed video. In the foregoing manner, in a process of classifying a video, a feature change of the video in a time dimension is also considered, so that video content can be better represented, the accuracy of video classification is improved, and the effect of video classification is improved.

Optionally, after the process of obtaining a to-be-processed video, the method may further include: processing each video frame in the to-be-processed video by using a convolutional neural network CNN, to obtain a time feature corresponding to each video frame; and determining a time feature sequence of the to-be-processed video according to the time feature corresponding to each video frame, the time feature sequence being configured for sampling.

In one embodiment, after obtaining the to-be-processed video, the server may process each video frame in the to-be-processed video by using a convolutional neural network (CNN) having an inception structure, and then extract a time feature corresponding to each video frame. Finally, the server determines the time feature sequence of the to-be-processed video according to the time feature of each video frame. Assuming that the first video frame of the to-be-processed video is 1, and the second video frame is 2, by this analogy, the last video frame is T, it may be determined that the time feature sequence of the to-be-processed video is T (seconds).

Figure 4:
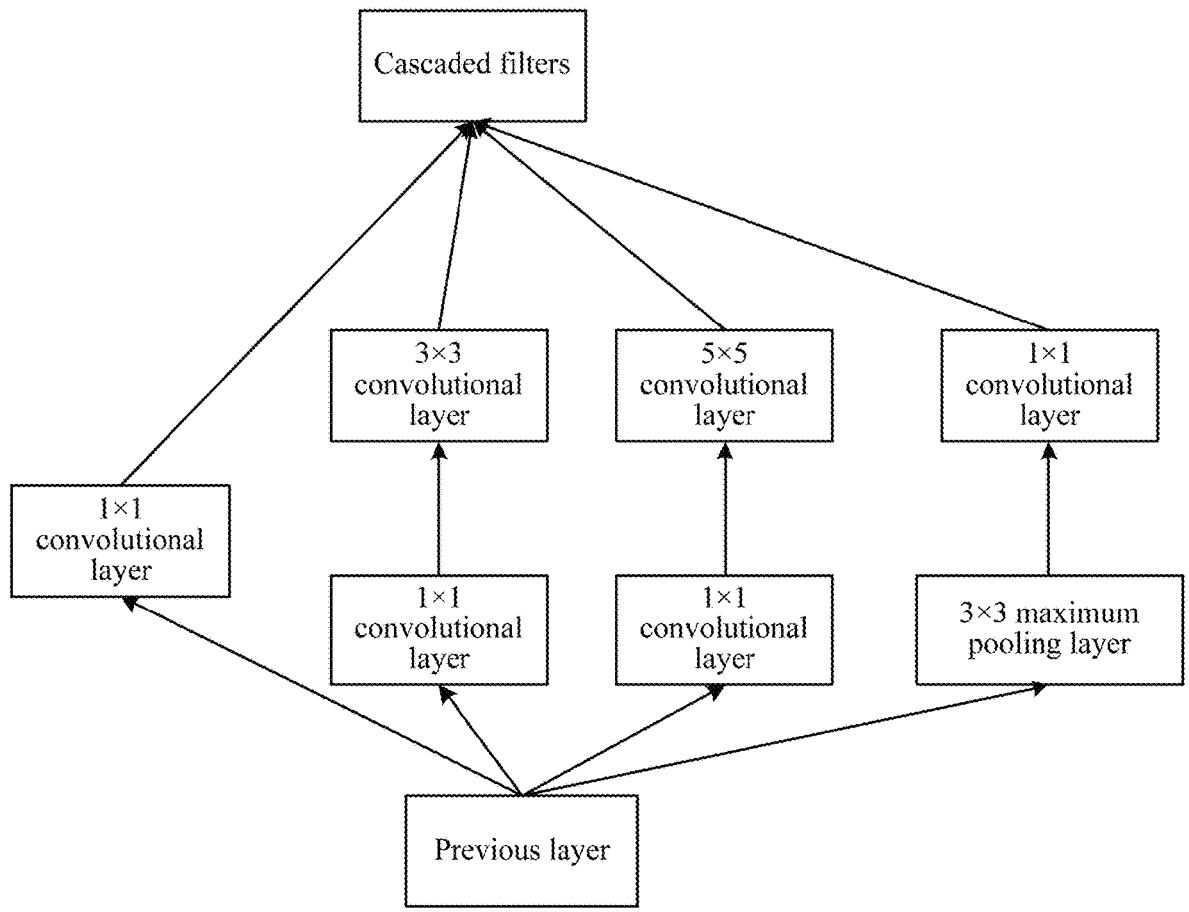
FIG. 4 is a schematic diagram of a convolutional neural network having an inception structure according to an embodiment of the present disclosure.

A CNN having an inception structure is described below. FIG. 4 is a schematic diagram of a convolutional neural network having an inception structure in an embodiment of the present disclosure. As shown in FIG. 4, the inception structure includes convolutions of three different sizes, namely, a 1×1 convolutional layer, a 3×3 convolutional layer, and a 5×5 convolutional layer, and in a 3×3 maximum pooling layer, a final fully-connected layer is removed, and a global average pooling layer (the size of the picture is changed to 1×1) is used to replace the fully-connected layer.

To enhance a network capability, a network depth and a network width may be increased. However, to reduce overfitting, free parameters also need to be reduced. Therefore, in a same layer of the inception structure, there are three different convolution templates for convolving the 1×1 convolutional layer, the 3×3 convolutional layer, and the 5×5 convolutional layer. Feature extraction may be performed on the three convolution templates in different sizes, and the three convolution templates are also a mixed model, because the maximum pooling layer also has the function of feature extraction, and different from convolution, no overfitting is performed without parameters, and the maximum pooling layer is used as a branch. However, directly doing this causes a relatively large calculation amount of the entire network, and the layer is not deepened. Therefore, 1×1 convolution is first performed before 3×3 convolution and 5×5 convolution, to reduce the number of input channels, so that the network is deepened, and the calculation amount is reduced.

Secondly, in one embodiment of the present disclosure, after obtaining the to-be-processed video, the server may further process each video frame in the to-be-processed video by using a convolutional neural network, and obtain a time feature corresponding to each video frame. The time features are used to form a time feature sequence of the entire to-be-processed video. In the foregoing manner, each video frame is trained and processed by using the convolutional neural network, to facilitate improvement of the accuracy and effect of time feature extraction.

Optionally, based on the first embodiment corresponding to FIG. 2, in a second optional embodiment of the information processing method provided in one embodiment of the present disclosure, the sampling the to-be-processed video according to a time-feature sampling rule, and obtaining at least one video frame feature sequence may include: determining at least one time window according to the time-feature sampling rule, each time window including at least one video frame of the to-be-processed video; and extracting, from the time feature sequence, a video frame feature sequence corresponding to each time window.

In one embodiment, how the server obtains the at least one video frame feature sequence is described below.

Specifically, at least one time-window is defined according to the time-feature sampling rule first, to sample the video frame feature sequence in a multi-scale manner. It may be assumed that the to-be-processed video has a total of T seconds, which separately use one video frame, five video frames, and 10 video frames as a time window, and video frames in the time window are averaged to obtain video frame feature sequences in three different scales. If T seconds are equal to 100 frames, one frame is used as the time window, and the length of the video frame feature sequence is T/1=T. If 10 frames are used as the time window, the finally obtained length of the video frame feature sequence is T/10. Therefore, the length of the video frame feature sequence is related to the size of the time window.

The size of the time window may be predefined manually. A larger number of video frames in one time-window indicates a larger granularity. An averaging operation is performed on content in each time-window, so that the content becomes content of "one frame".

Further, in one embodiment of the present disclosure, a method for extracting video frame feature sequences in different time scales is described. Namely, at least one time-window is first determined according to the time-feature sampling rule, and each time-window includes at least one video frame in the to-be-processed video, and then a video frame feature sequence corresponding to each time-window is extracted from the time feature sequence. In the foregoing manner, video frame feature sequences in different scales can be obtained, to obtain a plurality of different samples for feature training. In this way, the accuracy of a video classification result is improved.

Optionally, in one embodiment of the present disclosure, the processing the at least one video frame feature sequence by using a first neural network model, to obtain a feature representation result corresponding to each video frame feature sequence may include: inputting the at least one video frame feature sequence into a forward recurrent neural network in the first neural network model, to obtain a first representation result; inputting the at least one video frame feature sequence into a backward recurrent neural network in the first neural network model, to obtain a second representation result; and calculating a feature representation result corresponding to the at least one video frame feature sequence according to the first representation result and the second representation result.

In one embodiment, how to use the first neural network model to obtain the feature representation result corresponding to each video frame feature sequence is described below.

Figure 5:
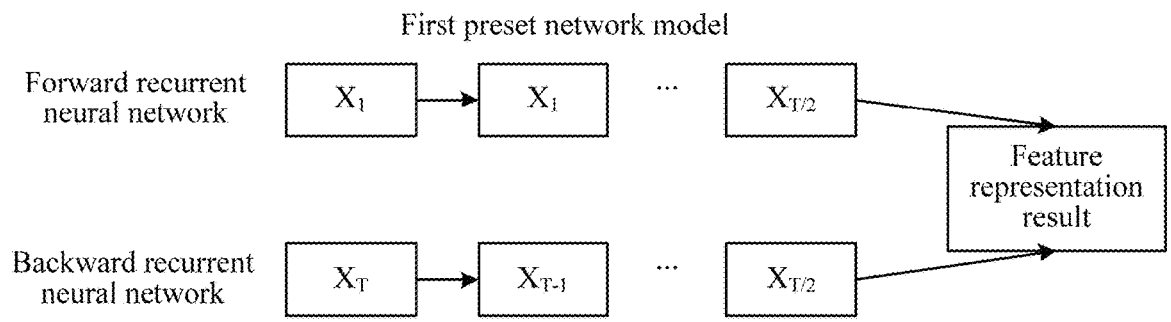
FIG. 5 is a schematic structural diagram of a first neural network model according to an embodiment of the present disclosure.

Specifically, FIG. 5 is a schematic structural diagram of a first neural network model in an embodiment of the present disclosure. As shown in FIG. 5, the entire first neural network model includes two parts, namely, a forward recurrent neural network and a backward recurrent neural network, and each video frame feature sequence is input into the forward recurrent neural network, and then a corresponding first representation result is outputted. Meanwhile, each video frame feature sequence is input into the backward recurrent neural network, and then a corresponding second representation result is outputted.

Finally, a feature representation result corresponding to the video frame feature sequence can be obtained by directly splicing the first representation result and the second representation result.

Further, in one embodiment of the present disclosure, based on extraction of the video frame feature sequence, time sequence modeling may be performed on the video frame feature sequence by using a recurrent gate unit based recurrent neural network. Further, to better perform feature representation on information of different time scales, in this solution, a first neural network model can also be used to perform video feature compression. In the foregoing manner, for the recurrent neural network, because main content of most videos occurs in the middle of video time, a bidirectional recurrent neural network is used to perform feature compression and representation respectively from forward and backward directions toward a time center point location of the to-be-processed video. In this way, the operability of the solution is improved.

Optionally, in one embodiment of the present disclosure, the calculating a feature representation result corresponding to the at least one video frame feature sequence according to the first representation result and the second representation result may include calculating the feature representation result corresponding to the at least one video frame feature sequence by using the following formulas:

$$h=[h_{T/2}^f, h_{T/2}^b];$$

$$h_t^f = GRU(x_t, h_{t-1}^f) \text{ for } t \in [1, T/2];$$

$$h_t^b = GRU(x_t, h_{t+1}^b) \text{ for } t \in [1, T/2]$$

where h represents a feature representation result of a video frame feature sequence, $h_{T/2}^f$ represents the first representation result, $h_{T/2}^b$ represents the second representation result, $x_t$ represents the video frame feature sequence at a tth moment, GRU ( ) represents use of a gated recurrent unit GRU for neural network processing, T represents total time of the to-be-processed video, and t represents an integer in a range of 1 to T.

In one embodiment, a bidirectional recurrent neural network may be used to perform feature compression and representation respectively from forward and backward directions toward a video time center point location. Specifically, for a video frame feature sequence $x_t$ of a particular scale, $t \in [1,T]$.

The forward recurrent neural network is:

$$h_t^f = GRU(x_t, h_{t-1}^f) \text{ for } t \in [1, T/2]$$

and the backward recurrent neural network is:

$$h_t^b = GRU(x_t, h_{t+1}^b) \text{ for } t \in [T, T/2]$$

where $h_t^f$ is an intermediate layer feature representation in the forward recurrent neural network, or may be represented as a first representation result $h_{T/2}^f$. $h_t^b$ is an intermediate layer feature representation of the backward recurrent neural network, or may be represented as a second representation result $h_{T/2}^b$. GRU ( ) is a recurrent gate unit function, and has a specific form of:

$$z_t = \sigma_g(W_z x_t + U_z h_{t-1} + b_z)$$

$$r_t = \sigma_g(W_r x_t + U_r h_{t-1} + b_r)$$

$$h_t = z_t \circ h_{t-1}(1-z_t) \circ \sigma_h(W_r x_t + U_h(r_t \circ h_{t-1}) + b_h);$$

where $\sigma_g$ represents a sigmoid function, and $\sigma_h$ represents an arc-tangent function. In addition, $W_z$, $W_r$, $W_t$, $U_z$, $U_r$, and $U_h$ are all linear transformation parameter matrices, and different subscripts respectively represent different "gates", and $b_z$, $b_r$, and $b_h$ are offset parameter vectors, and ○ represents calculation of a compound function.

Therefore, the first representation result and the second representation result may be spliced, to obtain a feature representation result corresponding to a scale, namely, $$h = [h_{T/2}^f, h_{T/2}^b].$$

Further, in one embodiment of the present disclosure, how to calculate the feature representation result corresponding to each video frame feature sequence according to the first representation result and the second representation result is specifically described. In the foregoing manner, the prediction result can be obtained by calculation by using related formulas, to provide feasible manners for implementation of the solution, thereby improving the feasibility and operability of the solution.

Optionally, in one embodiment of the present disclosure, the processing the feature representation result corresponding to the at least one video frame feature sequence by using a second neural network model, to obtain a prediction result corresponding to the at least one video frame feature sequence may include: inputting the feature representation result corresponding to the at least one video frame feature sequence into a first sub-model in the second neural network model, to obtain a third representation result; inputting the feature representation result corresponding to the at least one video frame feature sequence into a second sub-model in the second neural network model, to obtain a fourth representation result; and calculating the prediction result corresponding to the at least one video frame feature sequence according to the third representation result and the fourth representation result.

In one embodiment, how to use the second neural network model to obtain the prediction result corresponding to each video frame feature sequence is described below.

Figure 6:
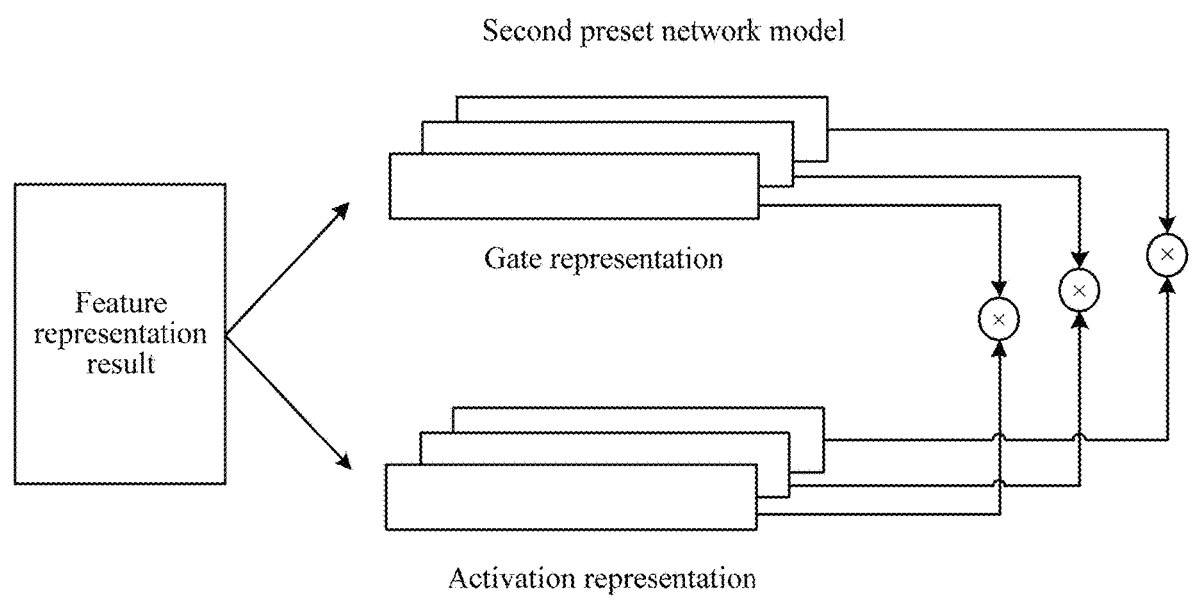
FIG. 6 is a schematic structural diagram of a second neural network model according to an embodiment of the present disclosure.

Specifically, FIG. 6 is a schematic structural diagram of a second neural network model in an embodiment of the present disclosure. As shown in FIG. 6, the entire second neural network model includes two parts: respectively a first sub-model and a second sub-model. The first sub-model may also be referred to as "gate representation", and the second sub-model may also be referred to as "activation representation". A feature representation result corresponding to each video frame feature sequence is input to the "gate representation", and then a corresponding third representation result is outputted. Meanwhile, a feature representation result corresponding to each video frame feature sequence is input to the "activation representation", and then a corresponding fourth representation result is outputted.

Each third representation result is multiplied by each fourth representation result, and then addition is performed, to obtain a prediction result of the video frame feature sequence.

Secondly, in one embodiment of the present disclosure, after the feature representation result is obtained by using the first neural network model, the second neural network model may be further used to classify the feature representation result. In the foregoing manner, non-linear transformation may be performed on the feature representation result to obtain gate representation and activation representation respectively, and then a multiplication operation is performed on the two paths of representations and addition is performed, to obtain a final feature representation for classification, thereby facilitating improvement of the classification accuracy.

Optionally, in one embodiment of the present disclosure, the calculating the prediction result corresponding to the at least one video frame feature sequence according to the third representation result and the fourth representation result may include: calculating the prediction result corresponding to the at least one video frame feature sequence by using the following formulas:

$$lable = \sum_{n=1}^{N} g_n a_n;$$

$$g_n = \sigma_g(W_g h + b_g), n \in [1, N];$$

$$a_n = \sigma_a(W_a h + b_a), n \in [1, N];$$

where lable represents a prediction result of a video frame feature sequence, $g_n$ represents the third representation result, $a_n$ represents the fourth representation result, $\sigma_g$ represents a softmax function, $\sigma_a$ represents a sigmoid function, h represents the feature representation result of the video frame feature sequence, $W_g$ and $b_g$ represent parameters in the first sub-model, $W_a$ and $b_a$ represent parameters of the second sub-model, N represents a calculation total number obtained after non-linear transformation is performed on the feature representation result, and n represents an integer in a range of 1 to N.

In one embodiment, how to use corresponding formulas to calculate the prediction result corresponding to each video frame feature sequence is specifically described below.

First, N paths of gate representation and activation representation are obtained by performing non-linear transformation on the feature representation result, and then a third representation result $g_n$ corresponding to the gate representation is calculated, and a fourth representation result $a_n$ corresponding to the activation representation is calculated. The order in which the third representation result $g_n$ and the fourth representation result $a_n$ are calculated is not limited herein.

After the two paths of representations are obtained, a multiplication operation is performed, and then an addition operation is performed, to obtain a prediction result of a video frame feature sequence.

Further, in one embodiment of the present disclosure, how to calculate the prediction result corresponding to each video frame feature sequence according to the third representation result and the fourth representation result is specifically described. In the foregoing manner, the prediction result can be obtained by calculation by using related formulas, to provide feasible manners for implementation of the solution, thereby improving the feasibility and operability of the solution.

Optionally, in one embodiment of the present disclosure, after the processing the feature representation result corresponding to the at least one video frame feature sequence by using a second neural network model, to obtain a prediction result corresponding to the at least one video frame feature sequence, the method may further include: calculating the category of the to-be-processed video according to the prediction result corresponding to the at least one video frame feature sequence and a weight value corresponding to the at least one video frame feature sequence; and classifying the to-be-processed video according to the category of the to-be-processed video.

In one embodiment, the server may further calculate the category of the to-be-processed video according to the prediction result corresponding to each video frame feature sequence, and a weight value corresponding to each video frame feature sequence, and classify the to-be-processed video according to a classification result.

Specifically, it is assumed that a maximum number of prediction results is five, and the prediction result is indicated by code "0 and 1" with a length of 5. For example, if the code of the prediction result 1 is 00001, and the code of the prediction result 3 is 00100, by this analogy, if a to-be-processed video includes both the prediction result 1 and the prediction result 3, the to-be-processed video is indicated as 00101.

However, for the entire to-be-processed video, a prediction result corresponding to each video frame feature sequence is obtained, and therefore each prediction result is not greater than 1, and the prediction result may indicate a possibility that the to-be-processed video belongs to the category. For example, {0.01, 0.02, 0.9, 0.005, 1.0} is a reasonable prediction result, and it means that a probability that the to-be-processed video belongs to the first category is 1.0, namely, 100%, a probability that the to-be-processed video belongs to the second category is 0.005, namely, 0.5%, a probability that the to-be-processed video belongs to the third category is 0.9, namely, 90%, a probability that the to-be-processed video belongs to the fourth category is 0.02, namely, 2%, and a probability that the to-be-processed video belongs to the fifth category is 0.01, namely, 1%.

In this case, the prediction result is calculated by using a preset weight value, and calculation may be performed by using a weighted algorithm. Each weight value is learned by using linear regression, and is a value, and indicates the importance of each video frame feature sequence, and a sum of weight values is 1, for example, {0.1, 0.4, 0.5}. How to calculate the category of the to-be-processed video is specifically described below.

If the weight value is {0.2, 0.3, 0.5}, the prediction result of the video frame feature sequence 1 is {0.01, 0.02, 0.9, 0.005, 1.0}, the prediction result of the video frame feature sequence 2 is {0.02, 0.01, 0.9, 0.000 0.9}, and the prediction result of the video frame feature sequence 3 is {0.2, 0.3, 0.8, 0.01 0.7}, the category of the to-be-processed video is indicated as:

0.2×0.01+0.3×0.02+0.5×0.2,0.2×0.02+0.3×0.01+0.5× 0.3,0.2×0.9+0.3×0.9+0.5×0.8,0.2×0.005+0.3× 0.000+0.5×0.01,0.2×1.0+0.3×0.9+0.5× 0.7={0.108,0.157,0.85,0.0075,0.82}

It can be understood from the result of the foregoing formula that, the probability that the to-be-processed video belongs to the third category is largest, and the probability that the to-be-processed video belongs to the first category is the second largest. Therefore, the to-be-processed video is displayed in a video list of the third category in priority.

Further, in one embodiment of the present disclosure, after obtaining the prediction result corresponding to each video frame feature sequence, the server may further calculate the category of the to-be-processed video according to the prediction result corresponding to each video frame feature sequence and the weight value corresponding to each video frame feature sequence, and finally classify the to-be-processed video according to the category of the to-be-processed video. In the foregoing manner, because the prediction result refers to the time feature, when the to-be-processed video is analyzed, the video classification capability can be improved, to implement personalized recommendation, and facilitate better practicability.

Figure 7:
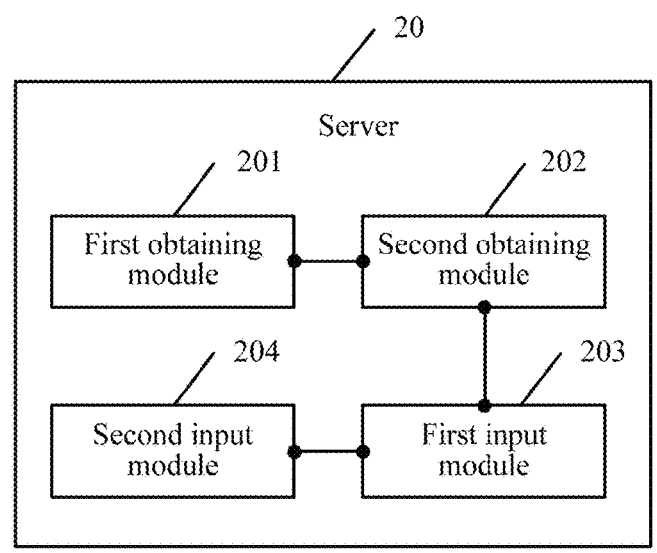
FIG. 7 is a schematic diagram of a server according to an embodiment of the present disclosure.
Figure 8:
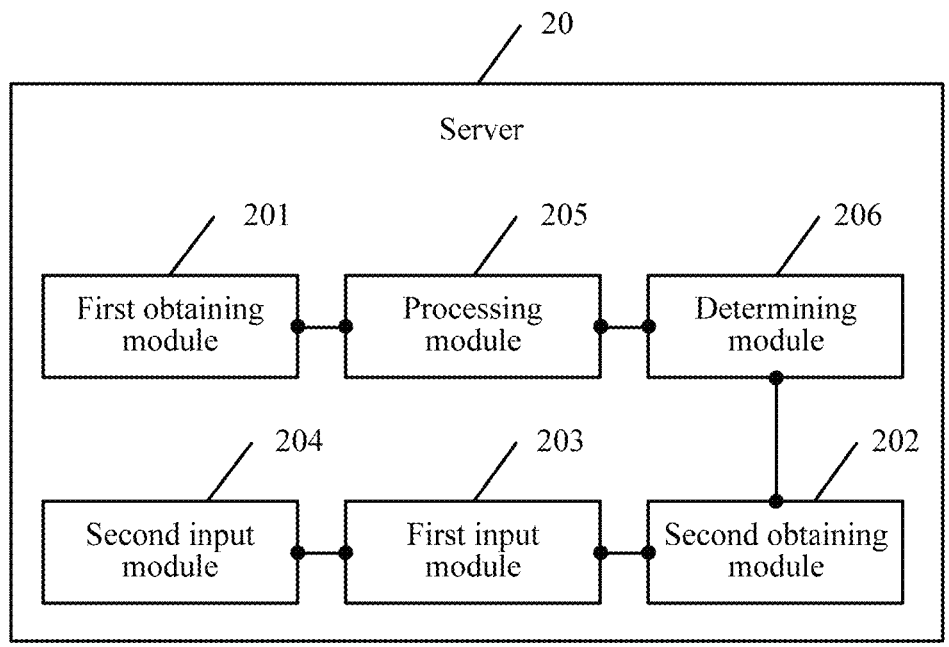
FIG. 8 is a schematic diagram of another server according to an embodiment of the present disclosure.

The following describes the server in the present disclosure in detail. FIG. 7 is a schematic diagram of an embodiment of a server in an embodiment of the present disclosure. As shown in FIG. 7, the server 20 includes: a first obtaining module 201, a second obtaining module 202, a first input module 203, and a second input module 204.

The first obtaining module 201 is configured to obtain a to-be-processed video, the to-be-processed video including a plurality of video frames, and each video frame corresponding to a time feature.

The second obtaining module 202 is configured to: sample, according to a time-feature sampling rule, the to-be-processed video obtained by the first obtaining module 201, and obtain at least one video frame feature sequence, the time-feature sampling rule being a correspondence between a time feature and a video frame feature sequence.

The first input module 203 is configured to process, by using a first neural network model, the at least one video frame feature sequence obtained by the second obtaining module 202, to obtain a feature representation result corresponding to the at least one video frame feature sequence, the first neural network model being a recurrent neural network model.

The second input module 204 is configured to process, by using a second neural network model, the feature representation result that corresponds to the at least one video frame feature sequence and that is obtained by the first input module 203, to obtain a prediction result corresponding to the at least one video frame feature sequence, the prediction result being used to determine a category of the to-be-processed video.

In one embodiment, the first obtaining module 201 obtains the to-be-processed video, the to-be-processed video including a plurality of video frames, and each video frame corresponding to a time feature; the second obtaining module 202 samples, according to the time-feature sampling rule, the to-be-processed video obtained by the first obtaining module 201, and obtains the at least one video frame feature sequence, the time-feature sampling rule being the correspondence between the time feature and the video frame feature sequence. The first input module 203 processes, by using the first neural network model, the at least one video frame feature sequence obtained by the second obtaining module 202, to obtain the feature representation result corresponding to the at least one video frame feature sequence, the first neural network model being a recurrent neural network model. The second input module 204 processes, by using the second neural network model, the feature representation result corresponding to the at least one video frame feature sequence obtained by the first input module 203, to obtain the prediction result corresponding to the at least one video frame feature sequence, the prediction result being used to determine the category of the to-be-processed video.

In an embodiment of the present disclosure, a server is provided. First, the server obtains the to-be-processed video, the to-be-processed video including a plurality of video frames, and each video frame corresponding to a time feature, and then samples the to-be-processed video according to the time-feature sampling rule, and obtains the at least one video frame feature sequence, the time-feature sampling rule being the correspondence between the time feature and the video frame feature sequence. The server then inputs the at least one video frame feature sequence into the first neural network model, to obtain the feature representation result corresponding to each video frame feature sequence. Finally, the server inputs the feature representation result corresponding to each video frame feature sequence into the second neural network model, to obtain the prediction result corresponding to each video frame feature sequence, the prediction result being used to determine the category of the to-be-processed video. In the foregoing manner, in a process of classifying a video, a feature change of the video in a time dimension is also considered, so that video content can be better represented, the accuracy of video classification is improved, and the effect of video classification is improved.

Optionally, in one embodiments of the present disclosure, the server 20 further includes a processing module 205, and a determining module 206.

The processing module 205 is configured to process each video frame in the to-be-processed video by using a convolutional neural network CNN, to obtain a time feature corresponding to each video frame after the first obtaining module 201 obtains the to-be-processed video.

The determining module 206 is configured to determine a time feature sequence of the to-be-processed video according to the time feature corresponding to each video frame processed by the processing module 205, the time feature sequence being configured for sampling.

In one embodiment of the present disclosure, after obtaining the to-be-processed video, the server may further process each video frame in the to-be-processed video by using a convolutional neural network, and obtain a time feature corresponding to each video frame. The time features are used to form a time feature sequence of the entire to-be-processed video. In the foregoing manner, each video frame is trained and processed by using the convolutional neural network, to facilitate improvement of the accuracy and effect of time feature extraction.

Figure 9:
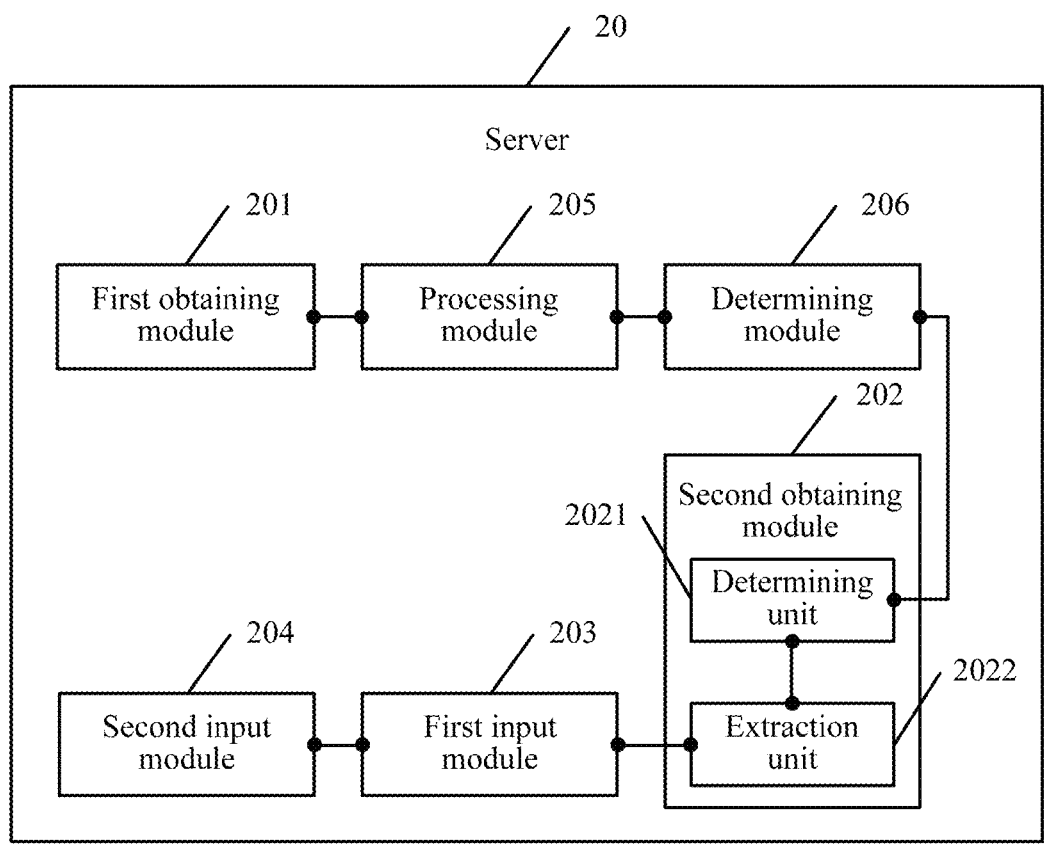
FIG. 9 is a schematic diagram of another server according to an embodiment of the present disclosure.

Optionally, referring to FIG. 9, in another embodiment of the server 20 provided in the embodiments of the present disclosure, the second obtaining module 202 includes: a determining unit 2021 configured to determine at least one time-window according to the time-feature sampling rule, each time-window including at least one video frame of the to-be-processed video; and an extraction unit 2022 configured to extract, from the time feature sequence, a video frame feature sequence corresponding to each time-window determined by the determining unit 2021.

Further, in one embodiment of the present disclosure, a method for extracting video frame feature sequences in different scales is described. That is, at least one time-window is first determined according to the time-feature sampling rule, and each time-window includes at least one video frame in the to-be-processed video, and then a video frame feature sequence corresponding to each time-window is extracted from the time feature sequence. In the foregoing manner, video frame feature sequences in different scales can be obtained, to obtain a plurality of different samples for feature training. In this way, the accuracy of a video classification result is improved.

Figure 10:
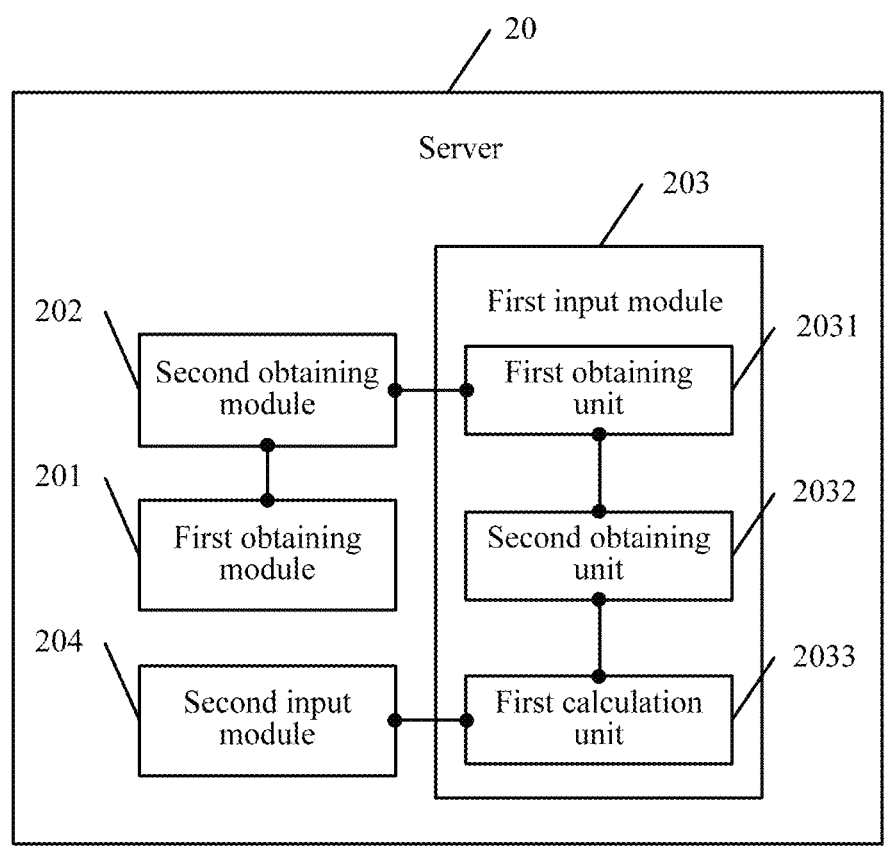
FIG. 10 is a schematic diagram of another server according to an embodiment of the present disclosure.

Optionally, referring to FIG. 10, in another embodiment of the server 20 provided in the embodiments of the present disclosure, the first input module 203 includes: a first obtaining unit 2031, a second obtaining unit 2032, and a first calculation unit 2033.

The first obtaining unit 2031 is configured to input the at least one video frame feature sequence into a forward recurrent neural network in the first neural network model, to obtain a first representation result.

The second obtaining unit 2032 is configured to input each video frame feature sequence into a backward recurrent neural network in the first neural network model, to obtain a second representation result.

The first calculation unit 2033 is configured to calculate a feature representation result corresponding to the at least one video frame feature sequence according to the first representation result obtained by the first obtaining unit 2031 and the second representation result obtained by the second obtaining unit 2032.

Secondly, in one embodiment of the present disclosure, based on extraction of the video frame feature sequence, time sequence modeling may be performed on the video frame feature sequence by using a recurrent gate unit based recurrent neural network. Further, to better perform feature representation on information of different time scales, in this solution, a first neural network model can also be used to perform video feature compression. In the foregoing manner, for the recurrent neural network, because main content of most videos occurs in the middle of video time, a bidirectional recurrent neural network is used to perform feature compression and representation respectively from forward and backward directions toward a time center location of the to-be-processed video. In this way, the operability of the solution is improved.

Figure 11:
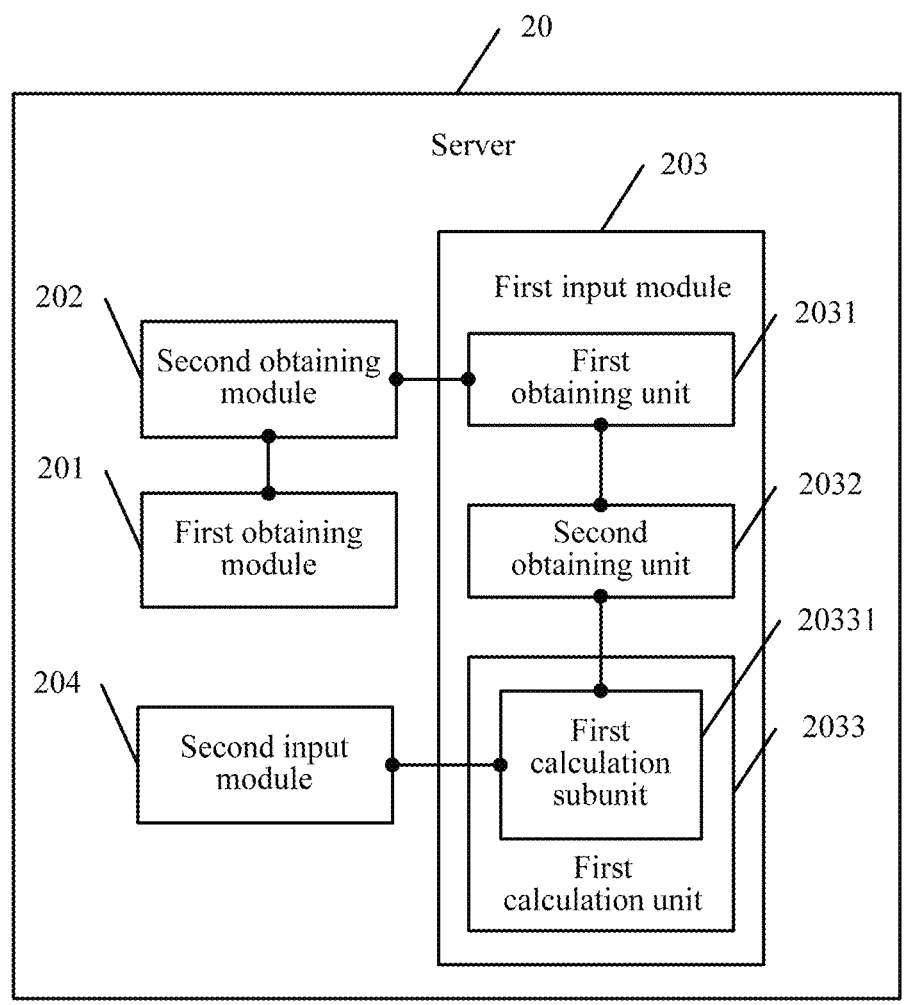
FIG. 11 is a schematic diagram of another server according to an embodiment of the present disclosure.

Optionally, referring to FIG. 11, in another embodiment of the server 20 provided in the embodiments of the present disclosure, the first calculation unit 2033 includes: a first calculation subunit 20331, configured to calculate the feature representation result corresponding to the at least one video frame feature sequence by using the following formulas:

$$h=[h_{T/2}^f, h_{T/2}^b];$$

$$h_t^f = GRU(x_t, h_{t-1}^f) \text{ for } t \in [1, T/2];$$

$$h_t^b = GRU(x_t, h_{t+1}^b) \text{ for } t \in [1, T/2]$$

where h represents a feature representation result of a video frame feature sequence, $h_{T/2}^f$ represents the first representation result, $h_{T/2}^b$ represents the second representation result, $x_t$ represents the video frame feature sequence at a tth moment, GRU ( ) represents use of a gated recurrent unit GRU for neural network processing, T represents total time of the to-be-processed video, and t represents an integer in a range of 1 to T.

Further, in one embodiment of the present disclosure, how to calculate the feature representation result corresponding to each video frame feature sequence according to the first representation result and the second representation result is specifically described. In the foregoing manner, the prediction result can be obtained by calculation by using related formulas, to provide feasible manners for implementation of the solution, thereby improving the feasibility and operability of the solution.

Figure 12:
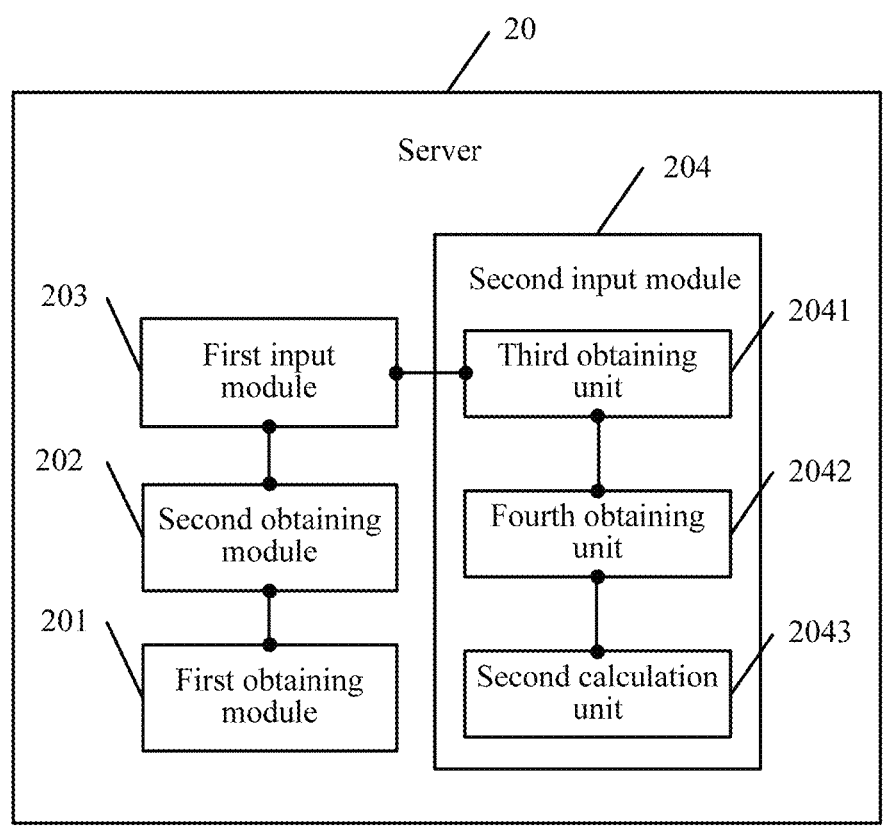
FIG. 12 is a schematic diagram of another server according to an embodiment of the present disclosure.

Optionally, referring to FIG. 12, in another embodiment of the server 20 provided in the embodiments of the present disclosure, the second input module 204 includes: a third obtaining unit 2041, a fourth obtaining unit 2042, and a second calculation unit 2043.

The third obtaining unit 2041 is configured to input the feature representation result corresponding to each video frame feature sequence into a first sub-model in the second neural network model, to obtain a third representation result.

The fourth obtaining unit 2042 is configured to input the feature representation result corresponding to each video frame feature sequence into a second sub-model in the second neural network model, to obtain a fourth representation result.

The second calculation unit 2043 is configured to calculate a prediction result corresponding to each video frame feature sequence according to the third representation result obtained by the third obtaining unit 2041 and the fourth representation result obtained by the fourth obtaining unit 2042.

Secondly, in one embodiment of the present disclosure, after the feature representation result is obtained by using the first neural network model, the second neural network model may be further used to classify the feature representation result. In the foregoing manner, non-linear transformation may be performed on the feature representation result to obtain gate representation and activation representation respectively, and then a multiplication operation is performed on the two paths of representations and addition is performed, to obtain a final feature representation for classification, thereby facilitating improvement of the classification accuracy.

Figure 13:
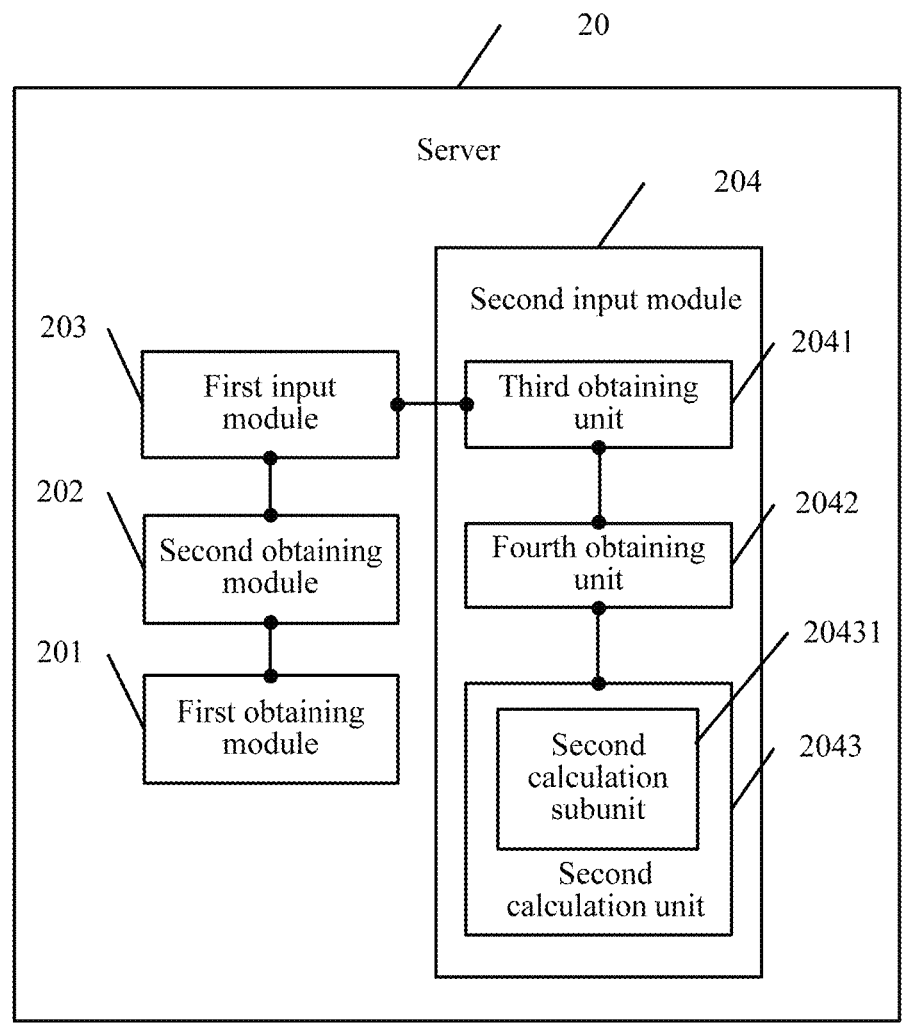
FIG. 13 is a schematic diagram of another server according to an embodiment of the present disclosure.

Optionally, referring to FIG. 13, in another embodiment of the server 20 provided in the embodiments of the present disclosure, the second calculation unit 2043 includes a second calculation subunit 20431, configured to calculate the prediction result corresponding to each video frame feature sequence by using the following formulas:

$$lable = \sum_{n=1}^{N} g_n a_n;$$

$$g_n = \sigma_g(W_g h + b_g), n \in [1, N];$$

$$a_n = \sigma_a(W_a h + b_a), n \in [1, N];$$

where lable represents a prediction result of a video frame feature sequence, $g_n$ represents the third representation result, $a_n$ represents the fourth representation result, $c_g$ represents a softmax function, $\sigma_a$ represents a sigmoid function, h represents the feature representation result of the video frame feature sequence, $W_g$ and $b_g$ represent parameters in the first sub-model, $W_a$ and $b_a$ represent parameters of the second sub-model, N represents a calculation total number obtained after non-linear transformation is performed on the feature representation result, and n represents an integer in a range of 1 to N.

Further, in one embodiment of the present disclosure, how to calculate the prediction result corresponding to each video frame feature sequence according to the third representation result and the fourth representation result is specifically described. In the foregoing manner, the prediction result can be obtained by calculation by using related formulas, to provide feasible manners for implementation of the solution, thereby improving the feasibility and operability of the solution.

Figure 14:
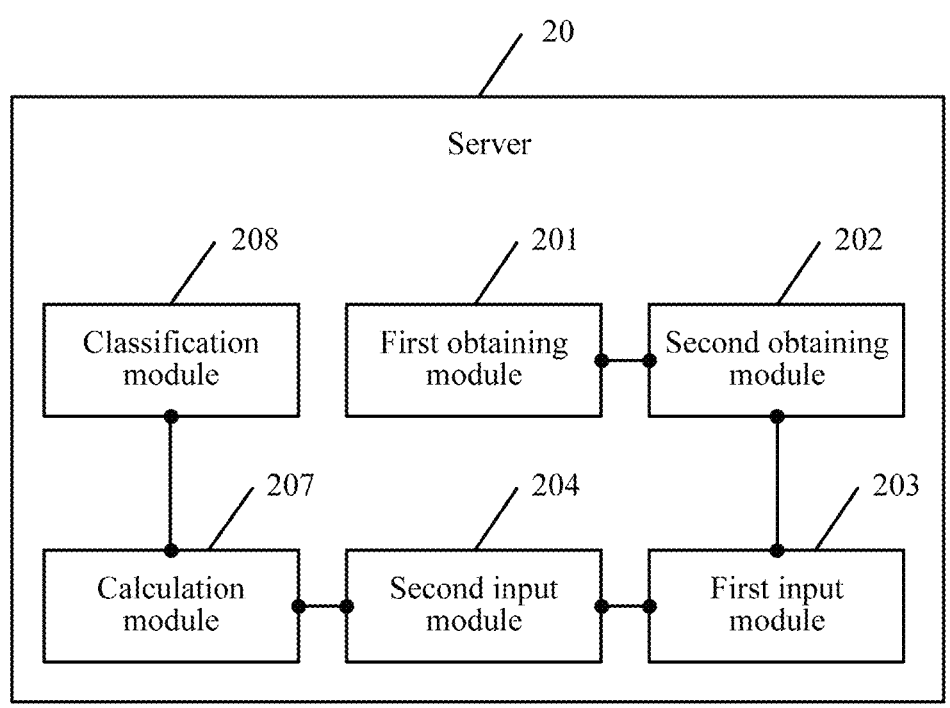
FIG. 14 is a schematic diagram of another server according to an embodiment of the present disclosure.

Optionally, referring to FIG. 14, in another embodiment of the server 20 provided in the embodiments of the present disclosure, the server 20 further includes a calculation module 207 and a classification module 208.

The calculation module 207 is configured to calculate the category of the to-be-processed video according to the prediction result corresponding to the at least one video frame feature sequence and a weight value corresponding to the at least one video frame feature sequence after the second input module 204 processes, by using the second neural network model, the feature representation result corresponding to the at least one video frame feature sequence, to obtain the prediction result corresponding to the at least one video frame feature sequence. The classification module 208 is configured to classify the to-be-processed video according to the category that is of the to-be-processed video and that is calculated by the calculation module 207.

Further, in one embodiment of the present disclosure, after obtaining the prediction result corresponding to each video frame feature sequence, the server may further calculate the category of the to-be-processed video according to the prediction result corresponding to each video frame feature sequence and the weight value corresponding to each video frame feature sequence, and finally classify the to-be-processed video according to the category of the to-be-processed video. In the foregoing manner, because the prediction result refers to the time feature, when the to-be-processed video is analyzed, the video classification capability can be improved, to implement personalized recommendation, and facilitate better practicability.

Figure 15:
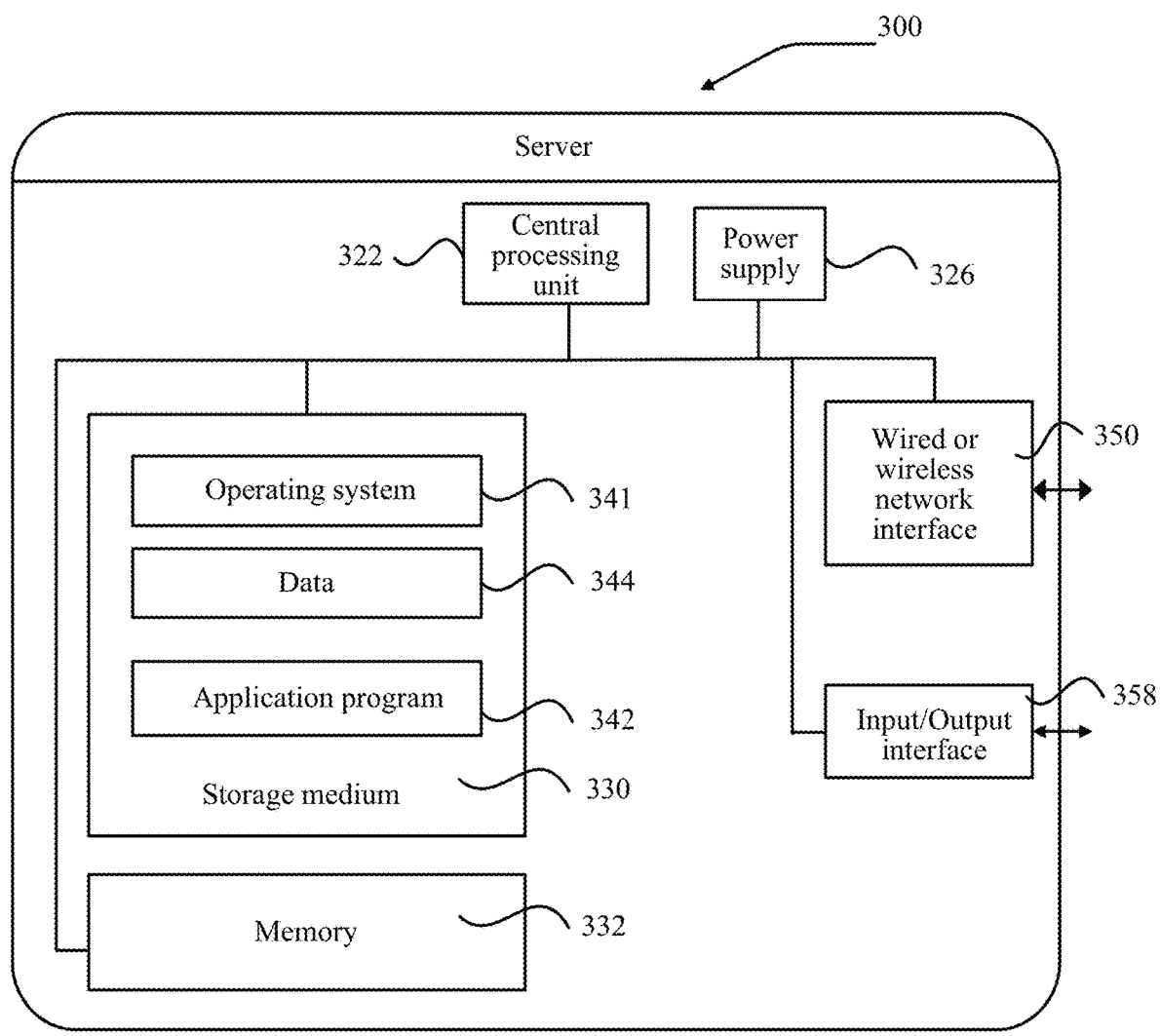
FIG. 15 is a schematic structural diagram of a server according to an embodiment of the present disclosure.

FIG. 15 is a schematic structural diagram of a server according to an embodiment of the present disclosure. The server 300 may vary greatly due to different configurations or performance, and may include one or more central processing units (CPU) 322 (for example, one or more processors) and a memory 332, and one or more storage media 330 (for example, one or more mass storage devices) that store an application program 342 or data 344. The memory 332 and the storage medium 330 may be transient storages or persistent storages. The program stored in the storage medium 330 may include one or more modules (which is not marked in the figure), and each module may include a series of instruction and operations to the server. Further, the central processing unit 322 may be configured to communicate with the storage medium 330, and perform, on the server 300, a series of instructions and operations in the storage medium 330.

The server 300 may further include one or more power supplies 326, one or more wired or wireless network interfaces 350, one or more input/output interfaces 358, and/or one or more operating systems 341, for example, Windows Server™, Mac OS X™, Unix™, Linux™, and FreeBSD™.

In one embodiment of the present disclosure, the CPU 322 included in the server has the following functions: obtaining a to-be-processed video, the to-be-processed video including a plurality of video frames, and each video frame corresponding to a time feature; sampling the to-be-processed video according to a time-feature sampling rule, and obtaining at least one video frame feature sequence, the time-feature sampling rule being a correspondence between a time feature and a video frame feature sequence; processing the at least one video frame feature sequence by using a first neural network model, to obtain a feature representation result corresponding to the at least one video frame feature sequence, the first neural network model being a recurrent neural network model; and processing the feature representation result corresponding to the at least one video frame feature sequence by using a second neural network model, to obtain a prediction result corresponding to the at least one video frame feature sequence, the prediction result being used to determine a category of the to-be-processed video.

Optionally, the CPU 322 is further configured to execute the following operations: processing each video frame in the to-be-processed video by using a convolutional neural network CNN, to obtain a time feature corresponding to each video frame; and determining a time feature sequence of the to-be-processed video according to the time feature corresponding to each video frame, the time feature sequence being configured for sampling.

Optionally, the CPU 322 is specifically configured to execute the following operations: determining at least one time-window according to the time-feature sampling rule, each time-window including at least one video frame of the to-be-processed video; and extracting, from the time feature sequence, a video frame feature sequence corresponding to each time-window.

Optionally, the CPU 322 is specifically configured to execute the following operations: inputting the at least one video frame feature sequence into a forward recurrent neural network in the first neural network model, to obtain a first representation result; inputting the at least one video frame feature sequence into a backward recurrent neural network in the first neural network model, to obtain a second representation result; and calculating a feature representation result corresponding to the at least one video frame feature sequence according to the first representation result and the second representation result.

Optionally, the CPU 322 is specifically configured to execute the following step: calculating the feature representation result corresponding to the at least one video frame feature sequence by using the following formulas:

$$h = [h_{T/2}^f, h_{T/2}^b];$$

$$h_t^f = GRU(x_t, h_{t-1}^f) \text{ for } t \in [1, T/2];$$

$$h_t^b = GRU(x_t, h_{t+1}^b) \text{ for } t \in [1, T/2]$$

where h represents a feature representation result of a video frame feature sequence, $h_{T/2}^f$ represents the first representation result, $h_{T/2}^b$ represents the second representation result, $x_t$ represents the video frame feature sequence at a tth moment, GRU ( ) represents use of a gated recurrent unit GRU for neural network processing, T represents total time of the to-be-processed video, and t represents an integer in a range of 1 to T.

Optionally, the CPU 322 is specifically configured to execute the following operations: inputting the feature representation result corresponding to the at least one video frame feature sequence into a first sub-model in the second neural network model, to obtain a third representation result; inputting the feature representation result corresponding to the at least one video frame feature sequence into a second sub-model in the second neural network model, to obtain a fourth representation result; and calculating the prediction result corresponding to the at least one video frame feature sequence according to the third representation result and the fourth representation result.

Optionally, the CPU 322 is specifically configured to execute the following step: calculating the prediction result corresponding to the at least one video frame feature sequence by using the following formulas:

$$lable = \sum_{n=1}^{N} g_n a_n;$$

$$g_n = \sigma_g(W_g h + b_g), n \in [1, N];$$

-continued $$a_n = \sigma_a(W_a h + b_a), n \in [1, N];$$

where lable represents a prediction result of a video frame feature sequence, $g_n$ represents the third representation result, $a_n$ represents the fourth representation result, $\sigma_g$ represents a softmax function, $\sigma_a$ represents a sigmoid function, h represents the feature representation result of the video frame feature sequence, $W_g$ and $b_g$ represent parameters in the first sub-model, $W_a$ and $b_a$ represent parameters of the second sub-model, N represents a calculation total number obtained after non-linear transformation is performed on the feature representation result, and n represents an integer in a range of 1 to N.

Optionally, the CPU 322 is further configured to execute the following operations: calculating the category of the to-be-processed video according to the prediction result corresponding to the at least one video frame feature sequence and a weight value corresponding to the at least one video frame feature sequence; and classifying the to-be-processed video according to the category of the to-be-processed video.

An embodiment of the present disclosure further provides a storage medium, for storing program code, the program code being configured to execute any implementation of the information processing method according to the foregoing embodiments.

In the foregoing embodiments, implementation may be entirely or partially performed by using software, hardware, firmware or any combination thereof. When software is used for implementation, implementation may be entirely or partially performed in the form of a computer program product.

The computer program product includes one or more computer instructions. When the computer program instructions are loaded and executed on a computer, all or some of the processes or functions according to the embodiments of the present disclosure are produced. The computer may be a general-purpose computer, a special-purpose computer, a computer network, or another programmable apparatus. The computer instructions may be stored in a computer readable storage medium or transmitted from one computer readable storage medium to another computer readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a digital versatile disc (DVD)), a semiconductor medium (such as a solid-state disk (SSD)) or the like.

It may be understood by persons skilled in the art that for convenience and brevity of description, for a detailed working process of the foregoing system, apparatus, and unit, reference may be made to a corresponding process in the foregoing method embodiments, and details are not described herein again.

In the several embodiments provided in the present disclosure, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated units may be implemented in a form of hardware or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash memory drive, a removable hard disk, a read-only memory (ROM), a random-access memory (RAM), a magnetic disk, or an optical disc.

In conclusion, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A video classification method for a computer device, comprising:
    obtaining a to-be-processed video, the to-be-processed video having a plurality of video frames, and each video frame corresponding to one time feature;
    sampling the to-be-processed video according to a time-feature sampling rule, and obtaining at least one video frame feature sequence, the time-feature sampling rule being a correspondence between time features and video frame feature sequences;
    processing the at least one video frame feature sequence by using a first neural network model, to obtain a feature representation result corresponding to the at least one video frame feature sequence, the first neural network model being a recurrent neural network model; and
    processing the feature representation result corresponding to the at least one video frame feature sequence by using a second neural network model, to obtain a prediction result corresponding to the at least one video frame feature sequence.

2. The method according to claim 1, further comprising:
    determining a category of the to-be-processed video according to the prediction result corresponding to the at least one video frame feature sequence.

3. The method according to claim 2, wherein, after the obtaining a to-be-processed video, the method further comprises:
    processing each video frame in the to-be-processed video by using a convolutional neural network CNN, to obtain a time feature corresponding to each video frame; and
    determining the at least one time feature sequence of the to-be-processed video according to the time feature corresponding to each video frame, the time feature sequence being configured for sampling.

4. The method according to claim 3, wherein the sampling the to-be-processed video according to a time-feature sampling rule, and obtaining at least one video frame feature sequence comprises:
    determining at least one time-window according to the time-feature sampling rule, each time-window comprising at least one video frame of the to-be-processed video; and
    extracting, from the time feature sequence, a video frame feature sequence corresponding to each time-window.

5. The method according to claim 2, wherein the processing the at least one video frame feature sequence by using a first neural network model, to obtain a feature representation result corresponding to each video frame feature sequence comprises:
    inputting the at least one video frame feature sequence into a forward recurrent neural network in the first neural network model, to obtain a first representation result;
    inputting the at least one video frame feature sequence into a backward recurrent neural network in the first neural network model, to obtain a second representation result; and
    calculating the feature representation result corresponding to the at least one video frame feature sequence according to the first representation result and the second representation result.

6. The method according to claim 5, wherein the calculating the feature representation result corresponding to the at least one video frame feature sequence according to the first representation result and the second representation result comprises:
    calculating the feature representation result corresponding to the at least one video frame feature sequence by using the following formulas:

$h=[h_{T/2}^f, h_{T/2}^b]$;

$h_t^f = GRU(x_t, h_{t-1}^f)$ for $t \in [1, T/2]$;

$h_t^b = GRU(x_t, h_{t+1}^b)$ for $t \in [T, T/2]$ wherein h represents a feature representation result of a video frame feature sequence, $h_{T/2}^f$ represents the first representation result, $h_{T/2}^b$ represents the second representation result, $x_t$ represents the video frame feature sequence at a tth moment, GRU ( ) represents use of a gated recurrent unit GRU for neural network processing, T represents total time of the to-be-processed video, and t represents an integer in a range of 1 to T.

7. The method according to claim 2, wherein the processing the feature representation result corresponding to the at least one video frame feature sequence by using a second neural network model, to obtain a prediction result corresponding to the at least one video frame feature sequence comprises:
inputting the feature representation result corresponding to the at least one video frame feature sequence into a first sub-model in the second neural network model, to obtain a third representation result;
inputting the feature representation result corresponding to the at least one video frame feature sequence into a second sub-model in the second neural network model, to obtain a fourth representation result; and
calculating the prediction result corresponding to the at least one video frame feature sequence according to the third representation result and the fourth representation result.

8. The method according to claim 7, wherein the calculating the prediction result corresponding to the at least one video frame feature sequence according to the third representation result and the fourth representation result comprises:
calculating the prediction result corresponding to the at least one video frame feature sequence by using the following formulas:

$$lable = \sum_{n=1}^{N} g_n a_n;$$
$$g_n = \sigma_g(W_g h + b_g), n \in [1, N];$$
$$a_n = \sigma_a(W_a h + b_a), n \in [1, N];$$

wherein lable represents a prediction result of a video frame feature sequence, $g_n$ represents the third representation result, $a_n$ represents the fourth representation result, $\sigma_g$ represents a softmax function, $\sigma_a$ represents a sigmoid function, h represents the feature representation result of the video frame feature sequence, $W_g$ and $b_g$ represent parameters in the first sub-model, $W_a$ and $b_a$ represent parameters of the second sub-model, N represents a calculation total number obtained after non-linear transformation is performed on the feature representation result, and n represents an integer in a range of 1 to N.

9. The method according to claim 2, wherein after the processing the feature representation result corresponding to the at least one video frame feature sequence by using a second neural network model, to obtain a prediction result corresponding to the at least one video frame feature sequence, the method further comprises:
calculating the category of the to-be-processed video according to the prediction result corresponding to the at least one video frame feature sequence and a weight value corresponding to the at least one video frame feature sequence; and
classifying the to-be-processed video according to the category of the to-be-processed video.

10. A non-transitory computer-readable storage medium storing computer program instructions executable by at least one processor to perform:
obtaining a to-be-processed video, the to-be-processed video having a plurality of video frames, and each video frame corresponding to one time feature;
sampling the to-be-processed video according to a time-feature sampling rule, and obtaining at least one video frame feature sequence, the time-feature sampling rule being a correspondence between time features and video frame feature sequences;
processing the at least one video frame feature sequence by using a first neural network model, to obtain a feature representation result corresponding to the at least one video frame feature sequence, the first neural network model being a recurrent neural network model; and
processing the feature representation result corresponding to the at least one video frame feature sequence by using a second neural network model, to obtain a prediction result corresponding to the at least one video frame feature sequence.

11. The non-transitory computer-readable storage medium according to claim 10, wherein the computer program instructions are executable by the processor to further perform:
determining a category of the to-be-processed video according to the prediction result corresponding to the at least one video frame feature sequence.

12. The non-transitory computer-readable storage medium according to claim 11, wherein the computer program instructions are executable by the processor to, after the obtaining a to-be-processed video, further perform:
processing each video frame in the to-be-processed video by using a convolutional neural network CNN, to obtain a time feature corresponding to each video frame; and
determining the at least one time feature sequence of the to-be-processed video according to the time feature corresponding to each video frame, the time feature sequence being configured for sampling.

13. The non-transitory computer-readable storage medium according to claim 12, wherein the sampling the to-be-processed video according to a time-feature sampling rule, and obtaining at least one video frame feature sequence comprises:
determining at least one time-window according to the time-feature sampling rule, each time-window comprising at least one video frame of the to-be-processed video; and
extracting, from the time feature sequence, a video frame feature sequence corresponding to each time-window.

14. The non-transitory computer-readable storage medium according to claim 11, wherein the processing the at least one video frame feature sequence by using a first neural network model, to obtain a feature representation result corresponding to each video frame feature sequence comprises:
inputting the at least one video frame feature sequence into a forward recurrent neural network in the first neural network model, to obtain a first representation result;
inputting the at least one video frame feature sequence into a backward recurrent neural network in the first neural network model, to obtain a second representation result; and calculating the feature representation result corresponding to the at least one video frame feature sequence according to the first representation result and the second representation result.

15. The non-transitory computer-readable storage medium according to claim 14, wherein the calculating the feature representation result corresponding to the at least one video frame feature sequence according to the first representation result and the second representation result comprises:
calculating the feature representation result corresponding to the at least one video frame feature sequence by using the following formulas:

$$h=[h_{T/2}^f, h_{T/2}^b];$$

$$h_t^f = GRU(x_t, h_{t-1}^f) \text{ for } t \in [1, T/2];$$

$$h_t^b = GRU(x_t, h_{t+1}^b) \text{ for } t \in [1, T/2]$$

wherein h represents a feature representation result of a video frame feature sequence, $h_{T/2}^f$ represents the first representation result, $h_{T/2}^b$ represents the second representation result, $x_t$ represents the video frame feature sequence at a tth moment, GRU ( ) represents use of a gated recurrent unit GRU for neural network processing, T represents total time of the to-be-processed video, and t represents an integer in a range of 1 to T.

16. The non-transitory computer-readable storage medium according to claim 11, wherein the processing the feature representation result corresponding to the at least one video frame feature sequence by using a second neural network model, to obtain a prediction result corresponding to the at least one video frame feature sequence comprises:
inputting the feature representation result corresponding to the at least one video frame feature sequence into a first sub-model in the second neural network model, to obtain a third representation result;
inputting the feature representation result corresponding to the at least one video frame feature sequence into a second sub-model in the second neural network model, to obtain a fourth representation result; and
calculating the prediction result corresponding to the at least one video frame feature sequence according to the third representation result and the fourth representation result.

17. The non-transitory computer-readable storage medium according to claim 16, wherein the calculating the prediction result corresponding to the at least one video frame feature sequence according to the third representation result and the fourth representation result comprises:
calculating the prediction result corresponding to the at least one video frame feature sequence by using the following formulas:

$$lable = \sum_{n=1}^{N} g_n a_n;$$

$$g_n = \sigma_g(W_g h + b_g), n \in [1, N];$$

$$a_n = \sigma_a(W_a h + b_a), n \in [1, N];$$

wherein lable represents a prediction result of a video frame feature sequence, $g_n$ represents the third representation result, $a_n$ represents the fourth representation result, $\sigma_g$ represents a softmax function, $\sigma_a$ represents a sigmoid function, h represents the feature representation result of the video frame feature sequence, $W_g$ and $b_g$ represent parameters in the first sub-model, $W_a$ and $b_a$ represent parameters of the second sub-model, N represents a calculation total number obtained after non-linear transformation is performed on the feature representation result, and n represents an integer in a range of 1 to N.

18. The non-transitory computer-readable storage medium according to claim 11, wherein after the processing the feature representation result corresponding to the at least one video frame feature sequence by using a second neural network model, to obtain a prediction result corresponding to the at least one video frame feature sequence, the computer program instructions are executable by the processor to further perform:
calculating the category of the to-be-processed video according to the prediction result corresponding to the at least one video frame feature sequence and a weight value corresponding to the at least one video frame feature sequence; and
classifying the to-be-processed video according to the category of the to-be-processed video.

19. A server, comprising:
a memory storing computer program instructions; and
a processor coupled to the memory and, when executing the computer program instructions, configured to perform:
obtaining a to-be-processed video, the to-be-processed video having a plurality of video frames, and each video frame corresponding to one time feature;
sampling the to-be-processed video according to a time-feature sampling rule, and obtaining at least one video frame feature sequence, the time-feature sampling rule being a correspondence between time features and video frame feature sequences;
processing the at least one video frame feature sequence by using a first neural network model, to obtain a feature representation result corresponding to the at least one video frame feature sequence, the first neural network model being a recurrent neural network model; and
processing the feature representation result corresponding to the at least one video frame feature sequence by using a second neural network model, to obtain a prediction result corresponding to the at least one video frame feature sequence.

20. The server according to claim 19, wherein the processor is further configured to perform:
determining a category of the to-be-processed video according to the prediction result corresponding to the at least one video frame feature sequence.

* * * * *